No. 621,803. Patented Mar. 28, 1899.
O. N. FELTS.
APPARATUS FOR FILTERING CIDER OR SPIRITS.
(Application filed Feb. 25, 1898).
(No Model.)
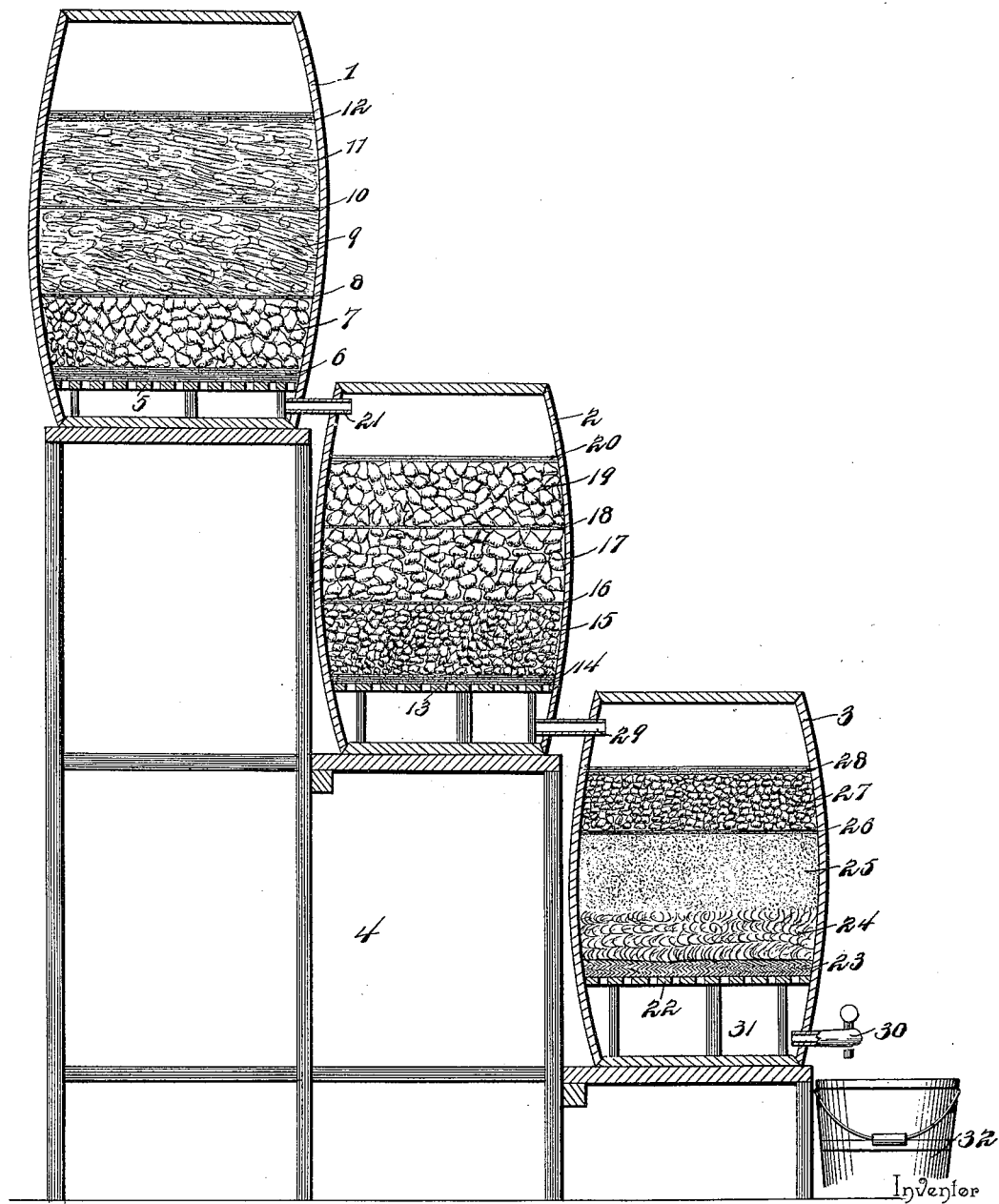
Witnesses
R H Shepard
V. B. Hillyard
Inventor
Oscar N. Felts
By his Attorneys,
C A Snow & Co.
THE NORRIS PETERS CO., PHOTO-LITHO., WASHINGTON, D. C.

United States Patent Office.

OSCAR N. FELTS, OF FULTON, MISSOURI, ASSIGNOR OF TWO-THIRDS TO T. E. JOHNSON, OF SAME PLACE.

APPARATUS FOR FILTERING CIDER OR SPIRITS.

SPECIFICATION forming part of Letters Patent No. 621,803, dated March 28, 1899.

Application filed February 25, 1898. Serial No. 671,612. (No model.)

*To all whom it may concern:*

Be it known that I, OSCAR N. FELTS, a citizen of the United States, residing at Fulton, in the county of Callaway and State of Missouri, have invented a new and useful Method of and Apparatus for Filtering Cider or Spirits, of which the following is a specification.

In accordance with this invention the cider, spirits, or like beverage to be clarified is caused to seep through alternate layers of filtering material which comprise in a great measure strata of gunny-sacking and hickory shavings, the latter being preferred, as they are not susceptible to souring, retain the curl better, are not liable to break, do not taint the liquid or impart any unpleasant taste thereto, and add perceptibly to the flavor.

The apparatus consists of a connected series of filters arranged at different levels, the one discharging into the other directly below and adjacent thereto and the filters being disposed so that they can be easily separated for cleansing and replenishing the filtering media when unfitted for further service either by clogging or deteriorating.

The invention will be described at length hereinafter, reference being had to the accompanying drawing, which is a vertical central section of an apparatus for carrying into effect the objects of this invention.

As intimated herein, the beverage, spirits, or liquid to be purified or rectified is passed through strata of gunny-sacking and hickory shavings disposed in alternate relation, and these strata may be disposed and used in connection with other filtering media, whereby the rectifying may be effected in the shortest space of time and in a thorough and effective manner.

As shown, the apparatus comprises a series of vessels, tanks, or receptacles arranged at different levels and intercommunicating and each being supplied with filtering strata, which will be referred to at length hereinafter. The number of these vessels or filters may vary according to the nature of the liquid under treatment; but for general use three are deemed sufficient and are indicated by the reference-numerals 1, 2, and 3 and are supported upon a suitable stand 4, having a stepped arrangement.

The upper vessel is provided with a false bottom 5, supported a short distance above the bottom of the vessel and upon which are placed layers of gunny-sacking 6 to the depth of about one inch. A stratum of coarse charcoal to the height of ten inches is placed upon the gunny-sacking 6 and is indicated at 7, and a layer of gunny-sacking 8 is placed thereon. A layer 9 of hickory shavings is placed upon the gunny-sacking 8 and is about one foot in depth and is covered by gunny-sacking 10, upon which latter is placed another layer 11 of hickory shavings, about equal in depth to the layer 9, and over all is placed a stratum of gunny-sacking 12, composed of at least four layers.

The vessel 2 has a false bottom 13, which is covered by a layer of gunny-sacking 14, comprising a number of folds and upon which is placed about ten inches of fine charcoal, as shown at 15, the latter being covered by gunny-sacking 16, upon which is placed a layer of animal charcoal 17 to the depth of about ten inches. A stratum of gunny-sacking 18 rests upon the charcoal 17 and supports a layer of coarse charcoal 19 to the depth of about eight inches, and this layer is protected by gunny-sacking 20. A short pipe 21 connects the upper portion of the vessel 2 with the space formed between the bottom of the vessel 1 and the false bottom 5.

The vessel 3 has a perforate false bottom 22, upon which is placed about two inches of felt 23, which supports about eight inches of cotton-batting 24. About one foot of white sand 25 is placed upon the stratum 24 and is covered by fine sacking 26, which receives about eight inches of fine charcoal 27, upon which is placed a layer of fine sacking 28. A pipe 29 connects the upper portion of the vessel 3 with the space formed between the bottom and the part 13 of the vessel 2. A spigot 30 is let into a side of the vessel 3 and communicates with the space 31 below the perforate bottom 22 and draws off the purified liquid into a suitable receptacle, as a pail or bucket 32.

The cider, spirits, or liquid to be treated is poured into the filter 1, and after percolating through the filtering media therein passes into the filter 2 and seeping through the filtering strata thereof passes into the filter 3 and permeating through the different strata is finally drawn off through the spigot 30 into a suitable receptacle and is ready for the market and consumption.

Having thus described the invention, what is claimed as new is—

1. A filter for cider and like beverages comprising a stratum of hickory shavings.

2. A filter for cider and like beverages comprising strata of gunny-sacking, and a stratum of hickory shavings placed between the gunny-sacking, substantially as specified.

3. In an apparatus for purifying cider, spirits and the like, a series of vessels located at different relative levels and having the lower portion of one in communication with the upper portion of the next lower in the series, each vessel being provided with a perforate false bottom located a distance above the bottom proper and a composite filtering medium composed of strata of different kinds of filtering material and gunny-sacking separating the filtering materials and placed about and below the composite filtering medium, substantially as set forth.

In testimony that I claim the foregoing as my own I have hereto affixed my signature in the presence of two witnesses.

OSCAR N. FELTS.

Witnesses:
D. P. BAILEY,
GEO. SCOTT PENN.